United States Patent [19]

Kamon et al.

[11] 4,329,624
[45] May 11, 1982

[54] COMPUTER TYPE ELECTRONIC PHOTOFLASH

[75] Inventors: Akio Kamon, Koganei; Sakyo Nagashima, Kawasaki; Yuzo Tsuruta, Yokohama, all of Japan

[73] Assignee: Kabushiki Kaisha Sunpak, Tokyo, Japan

[21] Appl. No.: 110,126

[22] Filed: Jan. 7, 1980

[30] Foreign Application Priority Data

Mar. 17, 1979 [JP] Japan .......................... 54-34759[U]
Mar. 19, 1979 [JP] Japan .......................... 54-34399[U]

[51] Int. Cl.³ ..................... H05B 41/32; G03B 15/05
[52] U.S. Cl. ................................ 315/151; 315/241 P; 354/34; 354/145
[58] Field of Search ........................ 315/241 P, 151; 354/32–35, 139, 141, 145, 149; 362/4, 7, 12, 13

[56] References Cited

U.S. PATENT DOCUMENTS

| | | | |
|---|---|---|---|
| 4,025,933 | 5/1977 | Berg | 354/141 |
| 4,078,242 | 3/1978 | Uchiyama et al. | 354/145 X |
| 4,095,242 | 6/1978 | Tsunekawa et al. | 354/35 X |
| 4,222,647 | 9/1980 | Kawarada et al. | 354/145 |

*Primary Examiner*—Eugene R. LaRoche
*Attorney, Agent, or Firm*—Neuman, Williams, Anderson & Olson

[57] ABSTRACT

A computer type electronic photoflash consisting of a main photoflash unit having photoflash emission and photoflash light volume control functions and a plurality of adapters connectable thereto. Each of said adapters is used with a photographic camera for which an electronic photoflash of special make and design is to be used exclusively. Each adapter serves for relaying electrical signals between the camera and the main photoflash unit and has an electric circuit adapted for this purpose. Thus, the number of the adapters is selected to be equal to the number of different descriptions of the photographic cameras for which respective electronic photoflashes of special make and design are to be used exclusively.

2 Claims, 10 Drawing Figures

COMPUTER TYPE ELECTRONIC PHOTOFLASH

BACKGROUND OF THE INVENTION

This invention relates to electronic photoflash units used in photography as artificial light sources. More particularly, it relates to computer type electronic photoflash units having adapters which make it possible to use the photoflash units with photographic cameras for each of which an electronic photoflash of a special make and design previously had to be used to the exclusion of other electronic photoflashes.

Electronic photoflashes are becoming almost an indispensable accessory to a photographic camera. Formerly, the function of the electronic photoflash was simply to flash upon reception of a synchronization signal from the camera, and the connection between the camera and the electronic photoflash was used simply for conveying this synchronization signal. However, the functional relation between the camera and the electronic photoflash has become rather complex with the advent of electronic photoflash units as described in U.S. Pat. Nos. 3,033,988 and 3,350,603 sometimes referred to as "computer" type electronic photoflash units. The computer type electronic photoflash is designed for automatically controlling the photoflash light volume as a function of the distance to the object being photographed. The control device is designed to terminate the light flash when the light reflected from the object as measured by a photometric circuit has attained a proper value. With the use of this computer type electronic photoflash, an optimum exposure to a value specified by the computer type electronic photoflash (hereafter referred to as the specified aperture). It is also proposed to provide computer type electronic photoflash units operating at a plurality of specified apertures In this case, a change in the specified aperture requires a corresponding change in the photometric conditions of the computer type electronic photoflash. Therefore, the user is required to set the camera aperture to the prevailing photometric conditions whenever the photometric conditions are changed, a practice often forgotten by the user. It is highly desired that the photometric condition of the computer type electronic photoflash be switched automatically to an optimum one corresponding to the camera aperture setting or that, conversely, the camera aperture be set to a proper value corresponding to the specified aperture of the computer type electronic photoflash. Moreover, since modern cameras often include photometric circuits themselves, if the photometric circuit of the camera is to be used for controlling the photoflash light volume of the computer type electronic photoflash, there is no necessity of changing the photometric conditions of the computer type electronic photoflash. To this end, the computer type electronic photoflash and the camera must be combined organically to each other.

Combinations of computer type electronic photoflash units and cameras capable of automatically making the desired adjustments as described have been proposed in the art and are presently available on the market. The electronic photoflash units for use in such combinations are often referred to as "dedicated" units. However, the manners in which the cameras and the photoflash units are combined are often different for different cameras and for cameras of different manufacturers. The situation has arisen where different ones of the different major camera manufacturers have marketed cameras having different schemes for combining their cameras and photoflash units. Each different scheme results in a camera which either supplies to or requires from the photoflash unit different combinations of electrical signals representing different parameters. Thus, users who own cameras of different manufacturers making use of different combination schemes have in the past been required to purchase different flash units for each of the cameras. Moreover, photoflash manufacturers who desire the supply units useful with cameras of many different manufacturers have in the past faced the prospect of supplying different units for each scheme of combination, a practice which is rather uneconomical. Thus, it has become desirable to provide apparatus by which a single photoflash unit may be used in common with cameras making use of various different interconnection schemes between the camera and the photoflash unit.

SUMMARY OF THE INVENTION

It is thus an object of the present invention to eliminate the above inconveniences of the prior art.

It is another object of the invention to provide an electronic photoflash which can be used in common to the various versions of cameras manufactured by different manufacturers and having different schemes for combining the camera and photoflash unit.

According to the present invention, the parts necessary for flashlight emission and control of flashlight volume are arranged as a main photoflash unit and an adapter to be mounted to the photographic camera is provided for each camera type, a complete photoflash unit being provided by connecting one of the adapters to the main photoflash unit. Each such adapter has an electric circuit required to adapt the main photoflash unit to the camera intended for use with that adapter. The connection between the main photoflash unit and the adapter may be so designed that the main unit is provided with plural receptacles and the adapter is provided with projecting connection terminals that may be introduced selectively into the desired receptacles of the main unit. Alternatively, such connection may be made by connecting cables. In the latter case, connector means are preferably provided to at least the main unit for connecting or disconnecting the connection cables.

DESCRIPTION OF PREFERRED EMBODIMENTS

Referring first to the embodiment of FIGS. 1-5, a computer type main electronic photoflash 10 has a circuit for photoflash emission and photoflash light volume control, and connection terminals for electric connection with adapters 11, 12 and 13. The electric circuit of the main photoflash unit is shown diagrammatically in FIG. 2. To a discharge capacitor 14 is connected in parallel a series circuit consisting of a discharge tube 15 and a silicon controlled rectifier (SCR) 16 as photoflash emission control element. A circuit for discharging of the discharge tube 15 is conventional per se and consists of a trigger capacitor 17, a trigger transformer 18 and another SCR 19. A synchronization signal from the camera is applied to the gate of the SCR 19 which is thereby rendered conductive for applying a high voltage pulse to the trigger electrode of the discharge tube 15 for discharging it. The SCR 16 is rendered conductive by the discharge of the tube 15 for continued discharge of the tube 15. A conventional photometric circuit 20 is so connected that its operation may be started by a voltage produced at a Zener diode during discharge of the discharge tube 15. A circuit consisting conventionally of another SCR 21 and a commutating capacitor 22 operates in response to the photometric circuit 20 to render the SCR 16 nonconductive thus stopping the discharge of the discharge tube 15. Thus, SCR's 16 and 21 and commutating capacitor 22 constitute the photoflash light volume control elements or circuit in the embodiment described for terminating discharge of the tube 15 and of the emitted light, whereas capacitor 17, transformer 18, and SCR 19 and their associated elements constitute the photoflash emission elements or circuit for initiating discharge of the tube 15 and the emitted light. The output of the photometric circuit 20 is connected, via a changeover switch 23, to the gate of the SCR 21 for activating the SCR 21. The switch 23 is changed over from the circuit 20 when an adapter to be later described comes into use. In some embodiments of this invention where there is no need for the main photoflash unit to be independently operable without an adapter, the photometric circuit 20 and switch 23 may be omitted. The main photoflash unit 10 has four terminals J, K, L and M wherein J denotes a terminal connected to a positive voltage source for charging capacitor 14, K a ground terminal, L a terminal connected to the gate of the SCR 21 when the switch 23 is changed over, and M a synchronization terminal.

Figure 1:
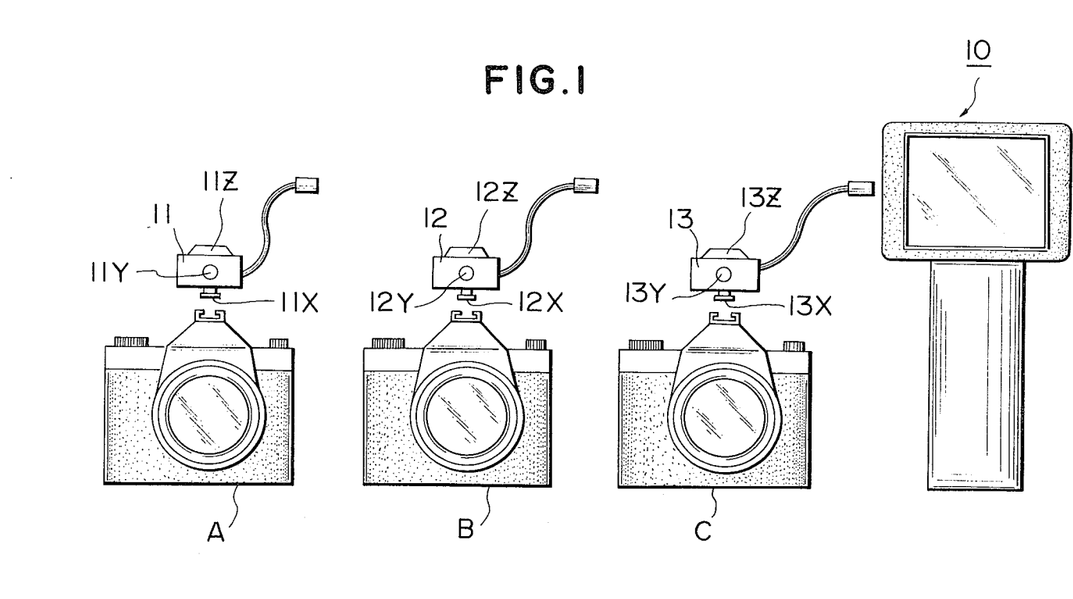
FIG. 1 is a front view showing a preferred embodiment of the present invention with three different cameras and their corresponding adapters of one form as contemplated by this invention.
Figure 2:
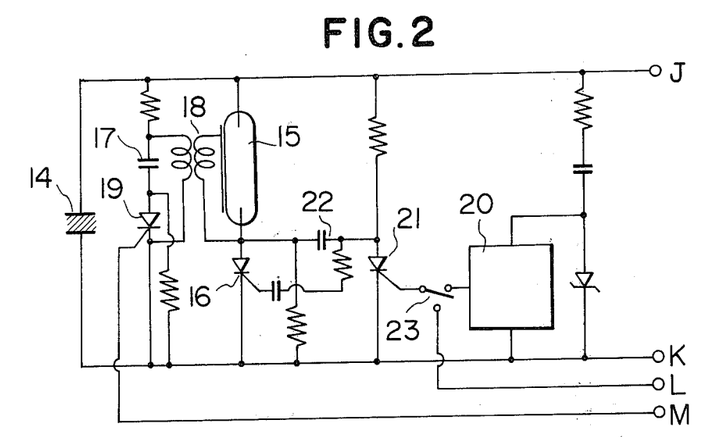
FIG. 2 is a schematic diagram of the main photoflash unit of the embodiment of FIG. 1.
Figures 3, 4, 5:
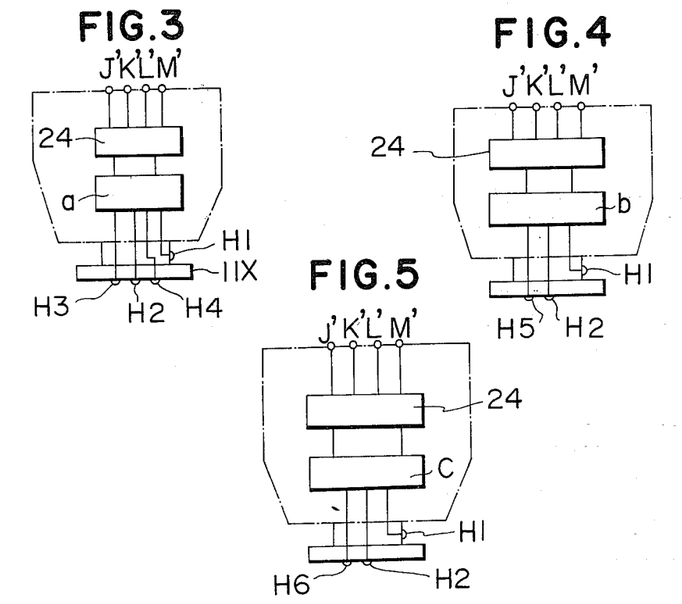
FIGS. 3, 4 and 5 are block diagrams of exemplary adapters of the embodiment of FIG. 1.

A photographic camera A is manufactured by a company A wherein the shutter speed is automatically set to a synchronization speed when the discharge capacitor is sufficiently charged that the voltage across it exceeds a predetermined level, and the aperture of the camera is automatically set by changing to the aperture specified by the autostrobe. To this end, a shoe of the camera A has two terminals in addition to ground and synchronization terminals. Thus, as shown in FIG. 3, a foot 11X of the adapter 11 has four terminals $H_1$, $H_2$, $H_3$, and $H_4$ for mating with the corresponding four terminals on camera A and for connection to the electric circuit a. The terminal $H_1$ is a ground terminal and the terminal $H_2$ is the synchronization terminal. Each of the adapters 11, 12 and 13 of the present embodiment has a photometric circuit 24 similar to the circuit 20. By virtue of this circuit 24, the combination of the present main photoflash unit 10 and the adapter may be used as computer type electronic photoflash fitted with a remote sensor.

Thus, the adapter 11 has a light receiving window 11Y through which it receives light reflected from the subject being photographed. The numeral 11Z denotes a dial for changing the specified aperture. This dial may be turned manually for changing the density of a filter arranged in front of a light receiving element positioned for receiving the light through the window 11Y and changing the photometric conditions of the photometric circuit 24, as disclosed in the U.S. Pat. No. 3,769,888. The circuit 24 has terminals J', K', L' and M' for connection to the terminals J, K, L and M of the main photoflash unit 10. The electric circuit a has a switching circuit operative for providing an approximately ground potential at the terminal $H_3$ when the voltage across the discharge capacitor 14 has reached a predetermined value, and a circuit operatively associated with rotation of the dial 11Z for providing a corresponding voltage level to the terminal $H_4$. The terminal $H_3$ is used for changing the shutter speed of the camera A to the synchronization speed, while the terminal $H_4$ controls the aperture of the camera A, as disclosed in the Japanese Provisional Publication No. 147937/1975.

A camera B is manufactured by a company B and has on its shoe a ground terminal, a synchronization terminal, and a further terminal for application of a series of pulses for bringing the shutter speed to a synchronization speed when the discharge capacitor is sufficiently charged, as described in the Japanese Provisional Publication No. 17331/1978. Thus, the adapter 12 as shown in FIG. 4 has on its foot a third terminal $H_5$ and also an electric circuit b designed as a pulse generating circuit that operates when the voltage across the discharge capacitor 14 has reached a predetermined value. The output of the pulse generating circuit is applied to the terminal $H_5$. In addition, the adapter has a photometric circuit 24 and a light receiving window 12Y for the light receiving element of the circuit 24, as in the case of the adapter 11.

A camera C is manufactured by a company C and has on its shoe a third terminal so that a third terminal $H_6$ is provided on the foot of adapter 13 as shown in FIG. 5. Contrary to the cameras A and B, camera C provides to the terminal $H_6$ an output from the photometric circuit inside the camera, as described in the Japanese Pat. Nos. 28569/1977 and 28570/1977. Thus, the electric circuit c of the adapter 13 as shown in FIG. 5 may simply be designed for applying its output to the terminal L'. In actuality, the signal from the camera is more negative than the ground potential, so the signal is converted into a positive voltage signal and applied to the terminal L'.

Thus, one who has purchased a camera A may purchase the main photoflash unit 10 and an adapter 11; one who has purchased a camera B may purchase a main photoflash unit 10 and an adapter 12; and one who has purchased a camera C may purchase a photoflash proper 10 and an adapter 13. In this way, a single main photoflash unit may be used for a variety of photographic cameras by selecting an adapter suited for the camera.

Figure 6:
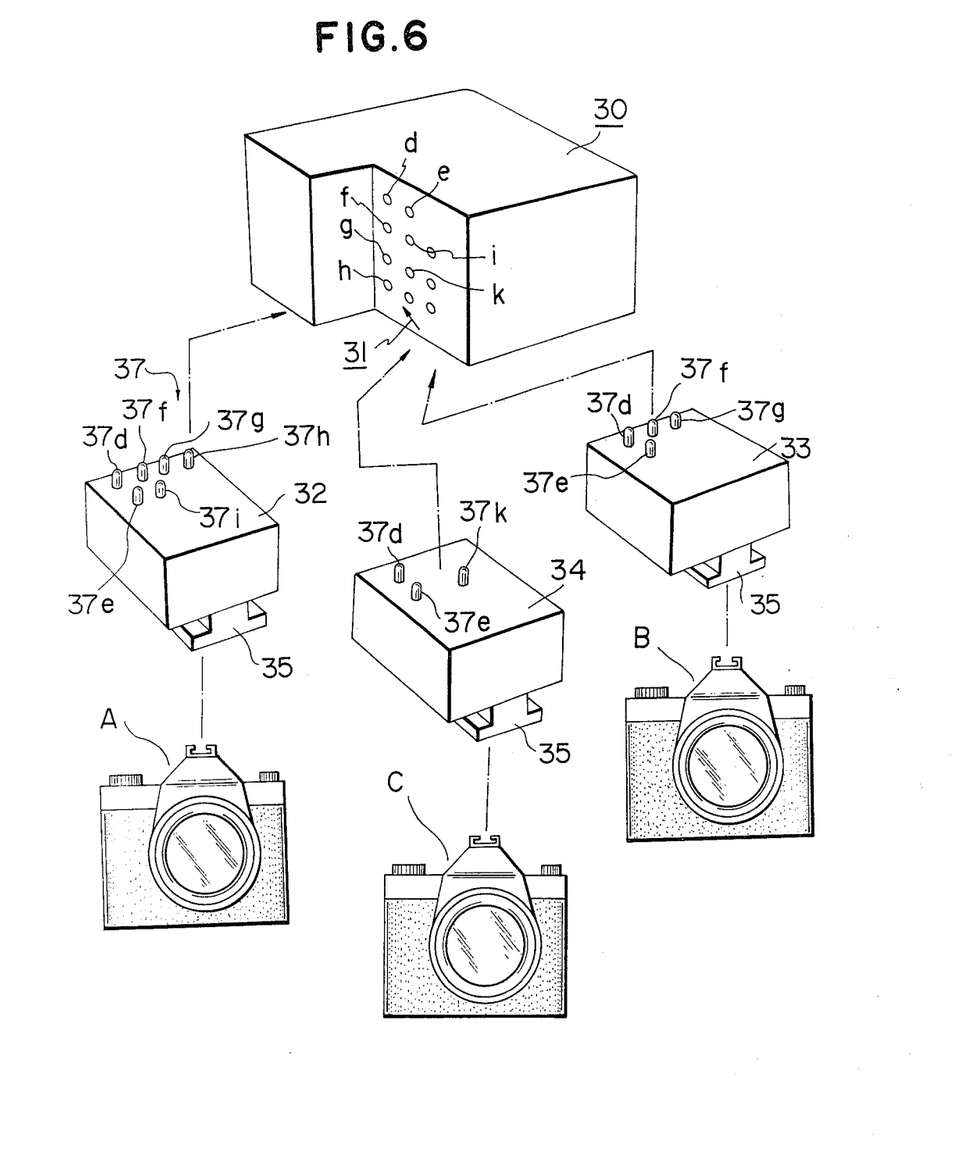
FIG. 6 is an exploded perspective view of a modified embodiment of the present invention with three different photographic cameras and their corresponding adapters of another form as contemplated by this invention.

FIG. 6 shows a modified embodiment of the invention wherein the main photoflash unit is connected directly to the adapter. The main photoflash unit diagrammatically illustrated at 30 has photoflash emission elements responsive to a synchronization signal from the camera for commencing a flash, and photoflash light volume control elements for terminating the flash, as in the case of the preceding embodiment. In this embodiment, all the circuits and components necessary for serving as a computer photoflash unit are incorporated in the main photoflash unit 30. This electronic photoflash can be switched between two aperture values, as desired. The outer casing of the main photoflash unit on the main photoflash unit 30 itself has a plurality of receptacles or connectors 31 all of which are separately indicated in FIG. 6 by lower case alphabetical letters e–i and k except reserve ones. Eleven receptacles or connectors are provided in the present embodiment, including four reserve receptacles.

Three adapters 32, 33 and 34 are provided for mounting to this main photoflash unit 30 and connecting it to one of the cameras A, B or C. Contrary to the preceding embodiment, no photometric circuits are provided in these adapters which operate simply for relaying of electrical signals between the main photoflash unit 30 and the cameras A, B or C although perhaps converting those electrical signals into a different form. The adapters 32, 33 and 34 are used with the cameras A, B and C, respectively. Each of these adapters has a foot 35 of the same shape for mounting to a camera accessory shoe and the lower surface of the foot 35 has terminals, not shown, but of the same form as shown in the corresponding FIGS. 3–5, for contacting with terminals provided at the shoe of the associated camera. The terminals on the shoes and feet serve for conveying electrical signals between each camera and each adapter associated therewith. On the mounting surface of each adapter to the main photoflash unit 30 there are provided connection terminals 37 that may be selectively inserted into the receptacles 31 on the main photoflash unit 30.

Six connection terminals 37d, 37e, 37f, 37g, 37h and 37i are provided on the adapter 32. These terminals are introduced into the receptacles 31 on the photoflash proper 30 bearing the corresponding alphabetical letters. Among these terminals, d denotes a ground terminal, c a synchronization terminal, f a terminal connected to the positive side of an electrical source battery in the main photoflash unit, g a terminal for supplying a signal indicative of completion of charging of the main discharge capacitor, and h and i denote terminals for providing aperture information. The photoflash proper 30 has two specified apertures, as stated above, designed for being switched by an aperture selection switch. This selection switch is operatively connected with the terminals h and i for producing predetermined circuit conditions at these terminals for controlling the aperture of camera A through the terminal provided on the foot 35.

The adapter 34 has three connection terminals 37d, 37e and 37k. The terminals 37d and 37e are used for the same purpose as indicated above for the adapter 32, while the terminal 37k is used for conveying a signal from a photometric circuit, not shown, inside the camera C to the control elements inside the main photoflash unit 30 through the receptacle k for controlling the flash volume.

The adapter 33 has four terminals 37d, 37e, 37f and 37g that may be used for the same purpose as described with reference to the adapter 32. There is provided in this adapter 33 a circuit designed for receiving a signal indicative of completion of the main capacitor charging and supplying a series of pulses of a predetermined cycle to a circuit inside the camera B.

Thus, if the adapter 32 is mounted to the photoflash proper 30, the adapter 32 and the main photoflash unit 30 are connected to each other electrically through the receptacles 31 and the terminals 37 so as to be used as a photoflash source for camera A. The adapters 33 and 34 may be used in the similar manner. An adapter provided with only connection terminals 37d and 37e may be used advantageously for cameras of the common type wherein the camera merely provides a contact closure between the synchronization terminal and ground to commence the operation of the computer photoflash unit.

Figure 7:
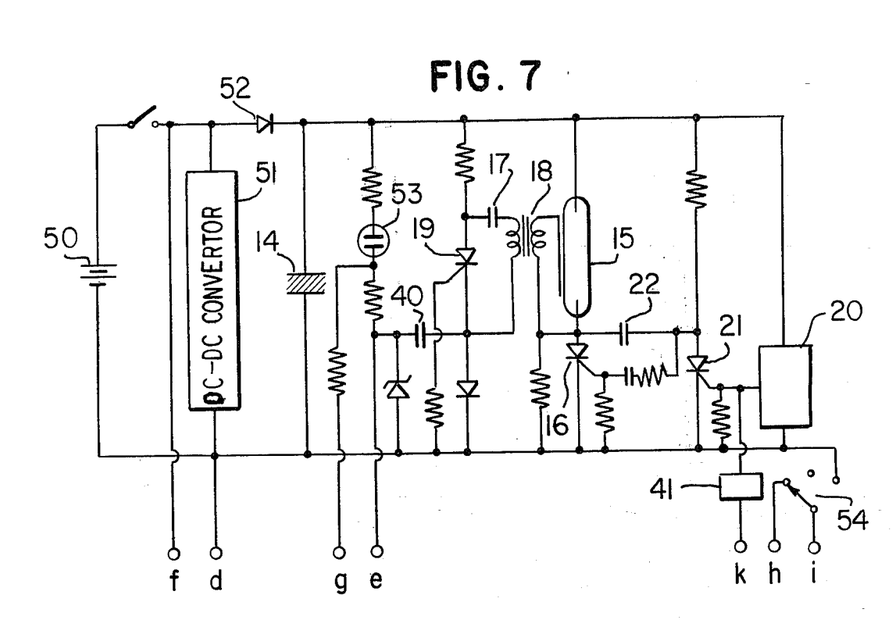
FIG. 7 is a schematic diagram of the main photoflash unit of the embodiment of FIG. 6.
Figure 8:
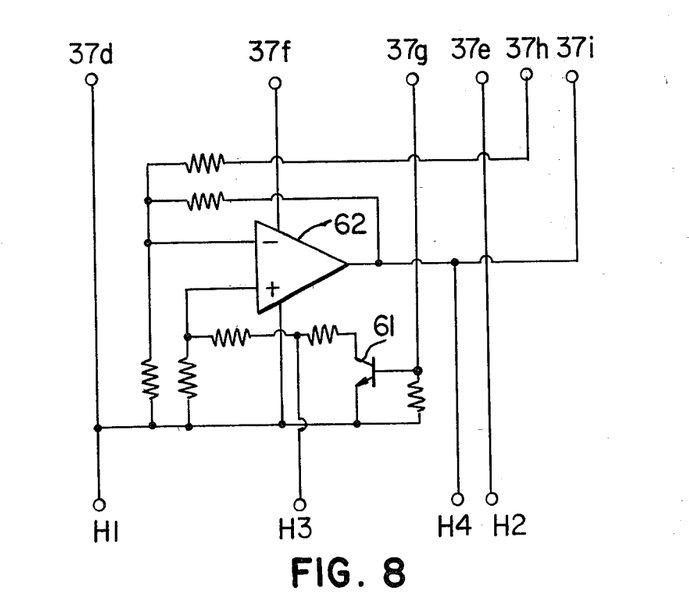
FIGS. 8, 9 and 10 are schematic diagrams of exemplary adapters of the embodiment of FIG. 6.
Figure 9:
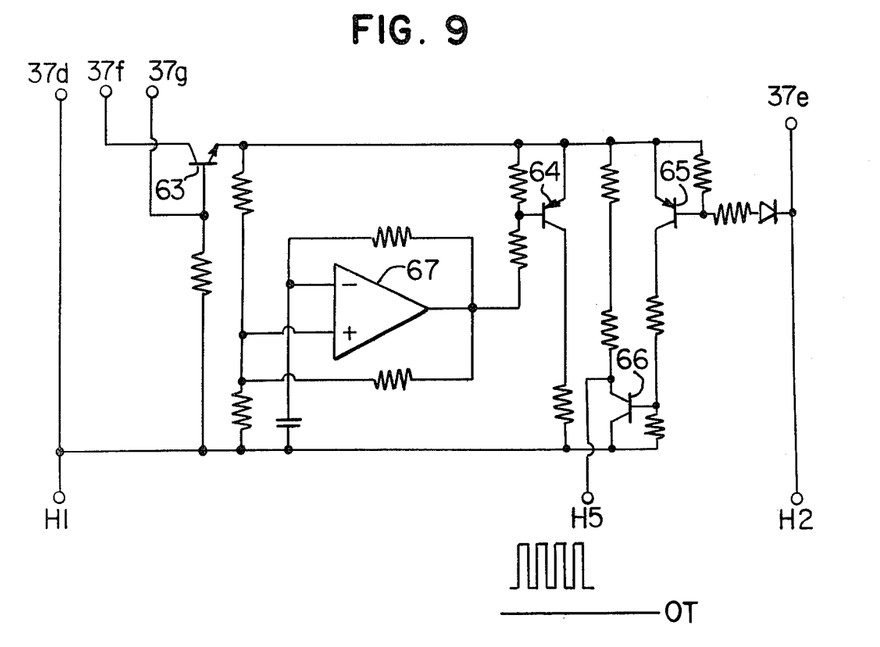
Figure 10:
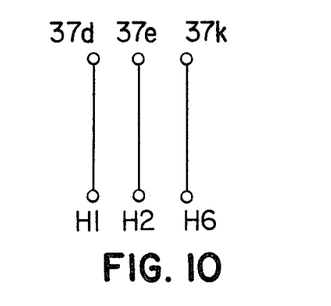

There is shown in FIG. 7 a schematic diagram of the circuitry of the main photoflash unit 30 and in FIGS. 8–10 schematic diagrams of the adapters 32–32, respectively. The receptacles d-i and k of FIG. 6 are connected to the circuit of FIG. 7 at the points bearing the corresponding reference letters, and the circuit points of FIGS. 8–10 corresponding to terminals $H_1$–$H_6$ of FIGS. 3–5 are correspondingly indicated. The circuit of photoflash unit 30 includes many components which are similar in description and operation to similarly numbered components of FIG. 2 and the description thereof will not be repeated. FIG. 7 additionally shows a battery 50, a d.c. to d.c. converter circuit 51, and a diode 52 for developing a potential across the capacitor 14 which is much higher than the battery potential, as well as a neon glow tube 53 and an associated resistor network for developing a positive potential at terminal g with respect to ground terminal d in response to capacitor 14 becoming fully charged. The circuit of FIG. 7 also includes a polarity converting circuit 41 to convert the flash termination circuit at terminal k to the polarity required to properly operate SCR 21 and a switch 54 for alternatively closing or opening the circuit between receptacles h and i depending upon which aperture is selected, or alternatively coupling receptacle i to ground.

The circuitry of adapter 32 shown in FIG. 8 includes a transistor 61 for converting the signal present at circuit point g to the polarity required at terminal $H_3$. An amplifier is also included for developing one of two different potentials at terminal $H_4$ corresponding to the aperture selected by the user through operation of switch 54 in the main photoflash unit 30 to either open or close the circuit between terminals h and i. If switch 54 is operated to connect terminal i to terminal d, i.e., to ground, then only a ground level potential will be present at terminal $H_4$.

The circuitry of the adapter 33 shown in FIG. 9 includes transistors 63–66 and amplifier 67 to generate a pulse signal of the nature there shown in response to a positive potential at terminal 37g for application through terminal $H_5$ to camera B. That pulse signal is terminated when the connection between terminals $H_1$ and $H_2$ is closed by the synchronization circuit of camera C at the time a photograph is taken. The circuitry of the adapter 34 as shown in FIG. 10 simply consists of direct electrical connections from each of terminals 37d, 37e and 37k to terminals $H_1$, $H_2$, and $H_6$, respectively. It should be apparent that the circuits of FIGS. 8–10 could be used as the circuits a-c, respectively, of adapters 11–13 of FIGS. 3–5 when used with a main photoflash unit 10 having the circuitry of FIG. 7.

Thus, according to the present invention, the main photoflash unit may be used with a variety of different photographic cameras by simply replacing the adapters, so that the overall cost may be lowered. The user may simply purchase a new adapter when purchasing a different photographic camera. According to the present invention, a circuit for signal relaying with the camera is provided inside the adapter. Thus, only the components for photoflash emission and photoflash light volume control need be contained inside the main photoflash unit. By providing reserve receptacles as in the present embodiment, it is only necessary to purchase an adapter for a new type of camera.

While only a limited number of embodiments of this invention have been disclosed, it is to be understood that this invention is not limited thereto but further includes that which falls fairly within the following claims.

We claim:

1. An adapter for interconnecting a camera and a flash unit wherein the flash unit includes a capacitor, a flash tube, discharge means for discharging said capacitor through said flash tube, and flash-termination means for terminating the discharge of said capacitor through said flash tube, said adapter comprising a set of camera terminals for connection to said camera, a set of flash unit terminals for connection to said flash unit, synchronizing means coupling said camera and flash unit terminals for conveying a synchronizing signal from said camera to said photoflash unit for initiating operation of said discharge means, photometric means in said adapter for responding to reflection of light developed by said flash unit, and a terminal for said adapter for connection to a terminal of said flash unit for conveying a signal from said photometric means to said flash termination means to initiate operation thereof.

2. An adapter as defined in claim 1, arranged for direct mounting between said flash unit and camera to provide a physical connection therebetween.

* * * * *

REEXAMINATION CERTIFICATE (718th)
United States Patent [19]

Kamon et al.

[11] B1 4,329,624

[45] Certificate Issued Jul. 7, 1987

[54] COMPUTER TYPE ELECTRONIC PHOTOFLASH

[75] Inventors: Akio Kamon, Koganei; Sakyo Nagashima, Kawasaki; Yuzo Tsuruta, Yokohama, all of Japan

[73] Assignee: Kabushiki Kaisha Sunpak, Tokyo, Japan

Reexamination Request:
No. 90/000,937, Jan. 13, 1986

Reexamination Certificate for:
Patent No.: 4,329,624
Issued: May 11, 1982
Appl. No.: 110,126
Filed: Jan. 7, 1980

[30] Foreign Application Priority Data

Mar. 17, 1979 [JP] Japan ............................. 54-34759[U]
Mar. 19, 1979 [JP] Japan ............................. 54-34399[U]

[51] Int. Cl.⁴ ...................... H05B 41/32; G03B 15/05
[52] U.S. Cl. ................................ 315/151; 315/241 P; 354/34; 354/145

[58] Field of Search ............. 315/241 P, 151; 354/32, 354/35, 139, 149, 141, 145; 362/4, 7, 12, 13

[56] References Cited

U.S. PATENT DOCUMENTS 3,769,888 11/1973 Quinn ............................... 95/100 E
3,846,806 11/1974 Yata et al. ............................ 354/31

*Primary Examiner*—Saxfield Chatmon

[57] ABSTRACT

A computer type electronic photoflash consisting of a main photoflash unit having photoflash emission and photoflash light volume control functions and a plurality of adapters connectable thereto. Each of said adapters is used with a photographic camera for which an electronic photoflash of special make and design is to be used exclusively. Each adapter serves for relaying electrical signals between the camera and the main photoflash unit and has an electric circuit adapted for this purpose. Thus, the number of the adapters is selected to be equal to the number of different descriptions of the photographic cameras for which respective electronic photoflashes of special make and design are to be used exclusively.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 2 are cancelled.

* * * * *